United States Patent
Koga et al.

(10) Patent No.: US 8,010,363 B2
(45) Date of Patent: Aug. 30, 2011

(54) COMMERCIAL DETECTION APPARATUS AND VIDEO PLAYBACK APPARATUS

(75) Inventors: Tatsuo Koga, Daito (JP); Yuji Yamamoto, Yawata (JP); Ryosuke Ohtsuki, Osaka (JP); Satoru Matsumoto, Izumi (JP)

(73) Assignee: SANYO Electric Co., Ltd., Morigchi, Osaka (JP)

( * ) Notice: Subject to any disclaimer, the term of this patent is extended or adjusted under 35 U.S.C. 154(b) by 1179 days.

(21) Appl. No.: 11/710,979

(22) Filed: Feb. 27, 2007

(65) Prior Publication Data
US 2007/0209055 A1 Sep. 6, 2007

(30) Foreign Application Priority Data

Feb. 28, 2006 (JP) .................................. 2006-052796
Mar. 20, 2006 (JP) .................................. 2006-077841

(51) Int. Cl.
*G10L 11/00* (2006.01)
(52) U.S. Cl. ........... 704/270; 704/210; 704/275; 725/42
(58) Field of Classification Search .................. 704/275, 704/210, 270; 725/42
See application file for complete search history.

(56) References Cited

U.S. PATENT DOCUMENTS

| | | | | |
|---|---|---|---|---|
| 5,708,477 A | * | 1/1998 | Forbes et al. | 348/552 |
| 6,275,646 B1 | * | 8/2001 | Tada et al. | 386/249 |
| 6,449,021 B1 | * | 9/2002 | Ohta et al. | 348/700 |
| 6,459,735 B1 | * | 10/2002 | Suito et al. | 375/240.15 |
| 6,600,874 B1 | * | 7/2003 | Fujita et al. | 386/249 |
| 6,718,121 B1 | * | 4/2004 | Shikunami | 386/109 |
| 6,782,186 B1 | * | 8/2004 | Covell et al. | 386/241 |
| 6,801,895 B1 | * | 10/2004 | Huang et al. | 704/270 |
| 6,993,245 B1 | * | 1/2006 | Harville | 386/250 |
| 7,110,658 B1 | * | 9/2006 | Iggulden et al. | 386/46 |
| 7,209,631 B2 | * | 4/2007 | Tada et al. | 386/250 |
| 7,302,160 B1 | * | 11/2007 | Wells | 386/250 |
| 7,617,095 B2 | * | 11/2009 | Stella et al. | 704/215 |
| 7,805,052 B2 | * | 9/2010 | Nakamura et al. | 386/326 |
| 2002/0080286 A1 | * | 6/2002 | Dagtas et al. | 348/738 |
| 2002/0197053 A1 | * | 12/2002 | Nakamura et al. | 386/35 |
| 2004/0125961 A1 | * | 7/2004 | Alessio et al. | 381/56 |
| 2005/0002644 A1 | * | 1/2005 | Nakamura et al. | 386/52 |

(Continued)

FOREIGN PATENT DOCUMENTS

JP 08-317342 A 11/1996

(Continued)

OTHER PUBLICATIONS

S. Marlow, D. A. Sadlier, K. McGeough, N. O'Connor, N. Murphy, "Audio and Video Processing for Automatic TV Advertisement Detection", Proceedings of ISSC, 2001.*

(Continued)

*Primary Examiner* — Richemond Dorvil
*Assistant Examiner* — Greg Borsetti
(74) *Attorney, Agent, or Firm* — NDQ&M Watchstone LLP

(57) ABSTRACT

An aspect of the invention provides a commercial detection apparatus for detecting commercials that includes a silent detector configured to detect a silent segment based on the strength of the audio signal output in content, and a determination unit configured to determine a sound segment as a commercial if three or more silent segments are detected essentially within a set time span, and if the sound segment is found between two of the three silent segments.

4 Claims, 9 Drawing Sheets

U.S. PATENT DOCUMENTS

| | | | |
|---|---|---|---|
| 2006/0259261 A1* | 11/2006 | Murabayashi | 702/104 |
| 2006/0263060 A1* | 11/2006 | Horiguchi et al. | 386/96 |
| 2007/0160347 A1* | 7/2007 | Tada et al. | 386/95 |
| 2007/0179786 A1* | 8/2007 | Masaki et al. | 704/270 |
| 2007/0286579 A1* | 12/2007 | Murabayashi et al. | 386/96 |
| 2008/0127244 A1* | 5/2008 | Zhang | 725/32 |

FOREIGN PATENT DOCUMENTS

| | | |
|---|---|---|
| JP | 2002-247516 A | 8/2002 |
| WO | 2005-124782 A1 | 12/2005 |

OTHER PUBLICATIONS

Ling-Yu Duan, Jinqiao Wang, Yantao Zheng, Jesse S. Jin, Hanqing Lu, Changsheng Xu, Segmentation, categorization, and identification of commercial clips from TV streams using multimodal analysis, Proceedings of the 14th annual ACM international conference on Multimedia, Oct. 23-27, 2006, Santa Barbara, CA, USA.*

A.G. Hauptmann and M.J. Witbrock, Story segmentation and detection of commercials in broadcast news video, in ADL-98 Advances in Digital Libraries, Santa Barbara, USA, 1998, pp. 168-179.*

P. Duygulu, M.-Y. Chen, A. Hauptmann, "Comparison and Combination of Two Novel Commercial Detection Methods", Proceedings of the International Conference on Multimedia and Expo (ICME2004), Taipei, Taiwan, 2004.*

English translation of JP-2002-247516 (machine translation by JPO).*

Office action issued Aug. 3, 2010 in counterpart Japanese application JP2006-077841.

* cited by examiner

FIG. 5

| n | START TIME Tn | END TIME Ty | FLAG BEFORE MAIN PROGRAM | IS SEGMENT BETWEEN n AND n+1 CM OR MAIN PROGRAM? |
|---|---|---|---|---|
| 1 | 0000.000 | 0001.020 | 1 | MAIN PROGRAM |
| 2 | 0023.531 | 0024.361 | 0 | CM |
| 3 | 0038.086 | 0039.402 | 0 | CM |
| 4 | 0053.341 | 0054.376 | 1 | MAIN PROGRAM |
| ⋮ | | | | |
| n | 2695.514 | 2696.308 | 0 | CM |
| n+1 | 2710.288 | 2711.298 | 0 | CM |
| n+2 | 2725.294 | 2726.356 | 1 | MAIN PROGRAM |
| ⋮ | | | | |

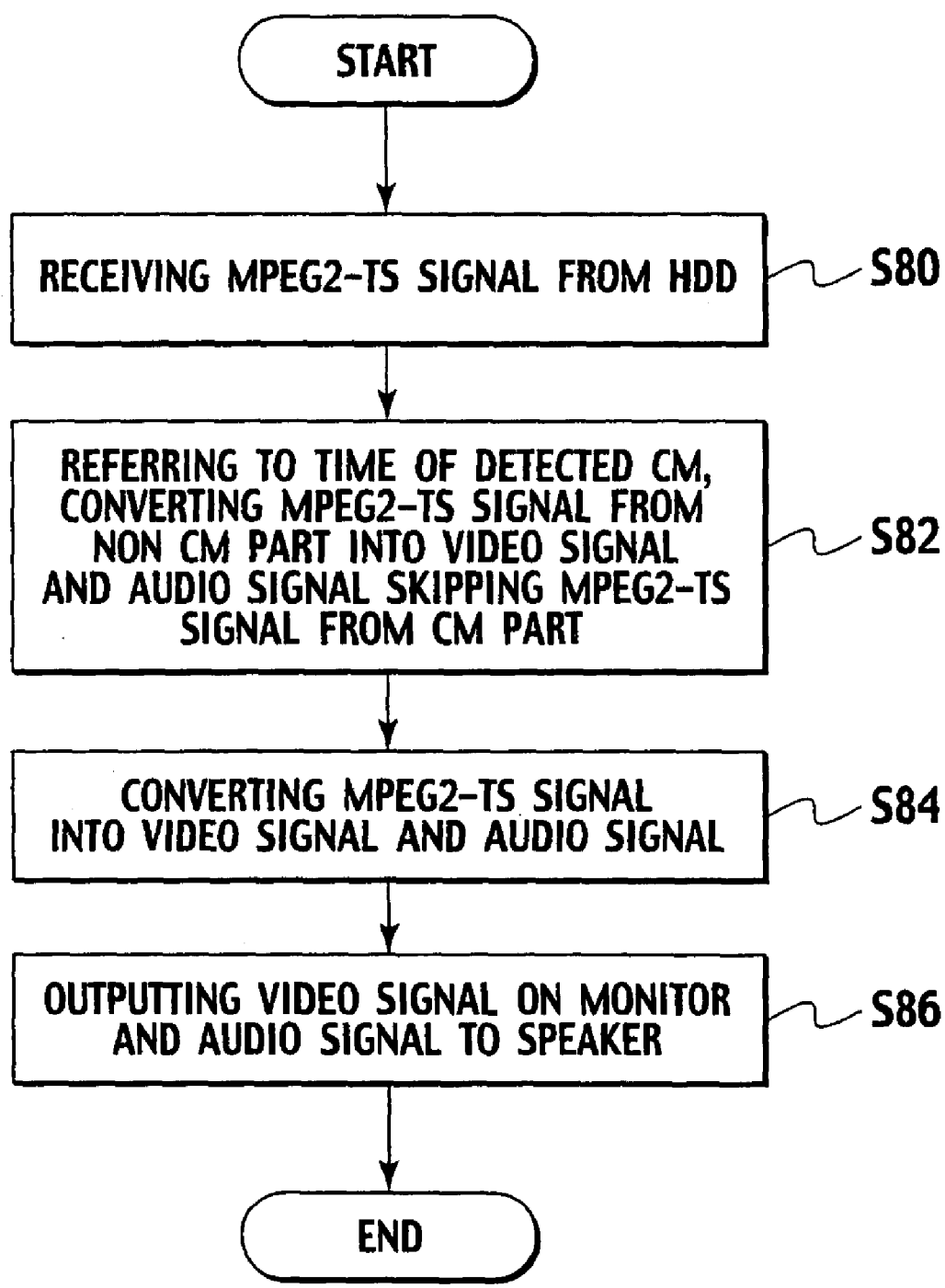

COMMERCIAL DETECTION APPARATUS AND VIDEO PLAYBACK APPARATUS

CROSS REFERENCE TO RELATED APPLICATIONS

This application claims priority based on 35 USC 119 from prior Japanese Patent Application No. P2006-52796 filed on Feb. 28, 2006 and Japanese Patent Application No. P2006-077841 filed on Mar. 20, 2006, the entire contents of which are incorporated herein by reference.

BACKGROUND OF THE INVENTION

1. Field of the Invention

The invention relates to a commercial (CM) detection apparatus that detects commercials and also relates to a video playback apparatus that utilizes the commercial detection apparatus.

2. Description of Related Art

Others have disclosed technologies that evaluate image and audio content to detect commercials. An example of this method is: analyzing contents of an audio signal, detecting silent segments via comparison with set threshold, and determining a segment between silent segments as a commercial if the period of time is equal to a commercial time period (e.g., fifteen seconds or thirty seconds).

Japanese Laid-Open Publication No. 2002-247516 describes a method of detecting commercial segments and recording without the commercial segments or detecting commercial segments and playback without the commercial segments. The commercial segments are detected between the silent segments. In accordance with this method, if there is a fifteen second period of a silent segment in the main program, the silent segment is determined as a commercial.

Additionally, a scenario exists where a silent segment in the boundary of the main program and a commercial extends beyond several seconds. In this scenario, if a transition time from continuous sound to silent or a transition time from silent to continuous sound for a start time or an end time of the silent segment or its median time is used, commercials might not be detected because the time span between the silent segments is not equal to the commercial time.

SUMMARY OF THE INVENTION

An aspect of the invention provides a commercial detection apparatus for detecting commercials that includes a silent detector configured to detect a silent segment based on the strength of the audio signal output in content, and a determination unit configured to determine a sound segment as a commercial if three or more silent segments are detected essentially within a set time span, and if the sound segment is found between two of the three silent segments.

Another aspect of the commercial detection apparatus includes a silent detector configured to detect a start time and an end time of a silent segment based on the strength of the audio signal output in content, and a determination unit configured to determine a sound segment as a commercial based on the detected silent segment, wherein the determination unit determines a sound segment as a commercial if the sound segment is found between consecutive silent segments that are detected by the silent detector, and wherein lag time of each start time is within a set time period, and determines a sound segment as a commercial if the sound segment is found between consecutive silent segments that are detected by the silent detector and wherein lag time of each end time is within a set time period.

Another aspect of the invention provides a video playback apparatus that includes a silent detector configured to detect one or more silent segments in an audio signal, a determination unit configured to determine a sound segment as a commercial if three or more silent segments are detected essentially within a set time span, and if the sound segment is found between two of the three silent segments, and a main program start extraction unit configured to extract silent segments transitioning from a commercial to the main program, a playback controller configured to playback a digest of a main program while skipping one or more sound segments that are determined as commercials based on the extracted silent segments.

Another aspect of the video playback apparatus that includes a silent detector configured to detect a start time and an end time of a silent segment based on the strength of the audio signal output in content, a determination unit configured to determine a sound segment a as commercial based on the detected silent segment, a main program start extraction unit configured to extract silent segments transitioning from a commercial to the main program, and a playback controller configured to playback a digest of a main program while skipping one or more sound segments that are determined as commercials based on the extracted silent segments, wherein the determination unit determines a sound segment as a commercial if the sound segment is found between consecutive silent segments that are detected by the silent detector, and wherein lag time of each start time is within a set time period, and determines a sound segment as a commercial if the sound segment is found between consecutive silent segments that are detected by the silent detector and wherein lag time of each end time is within a set time period.

BRIEF DESCRIPTION OF THE DRAWINGS

FIG. 5 is a diagram showing an example of silent segment information according to the embodiment.

FIG. 9 is a flowchart showing a commercial skip playback process according to the embodiment.

DETAILED DESCRIPTION OF EMBODIMENTS

Figure 1:
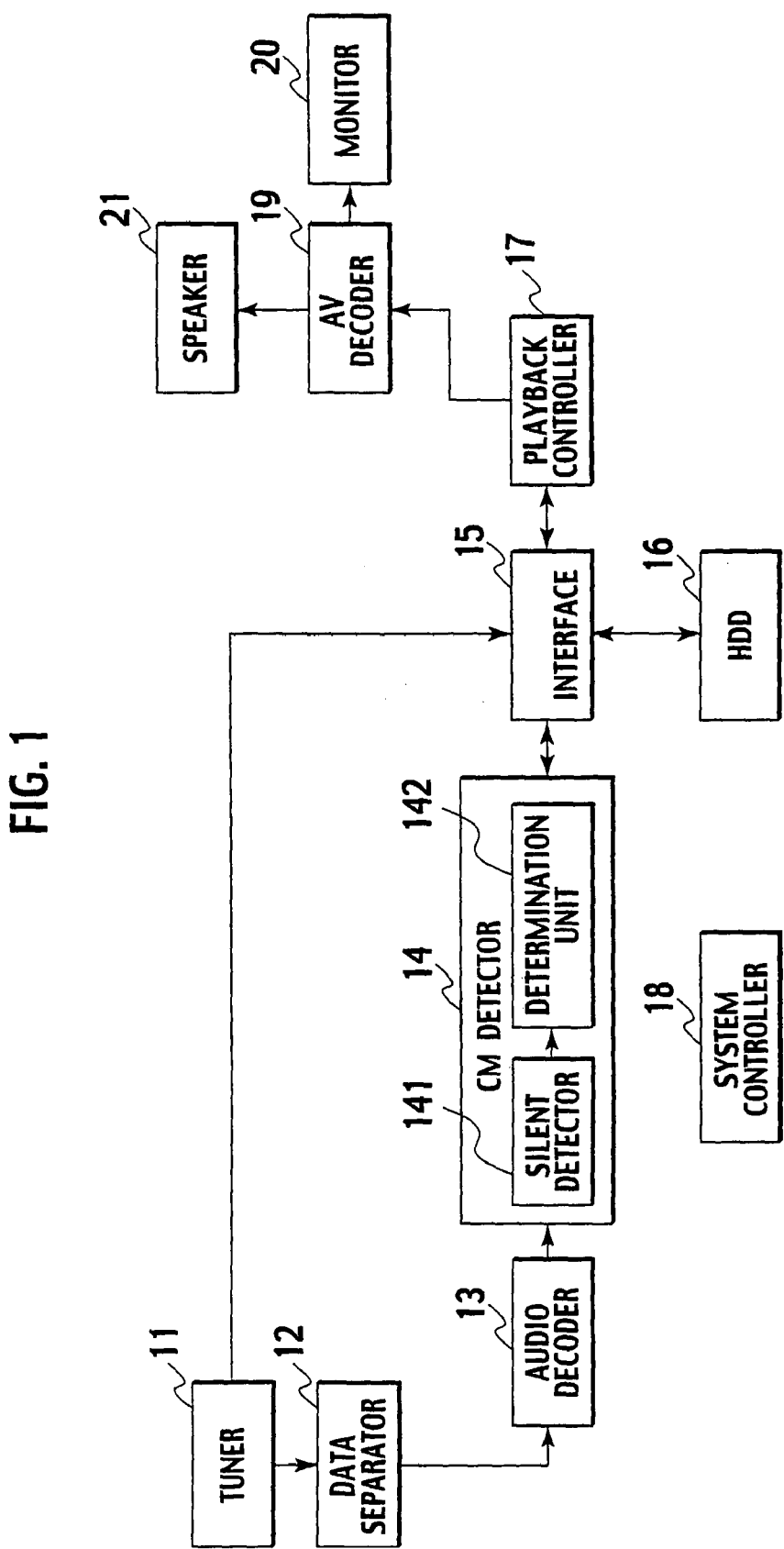
FIG. 1 is a block diagram that shows a video playback apparatus according to an embodiment.

An embodiment of the invention is described with reference to the accompanying drawings. FIG. 1 is a diagram that shows the structure of a video playback apparatus according to the embodiment. As shown in the figure, the video playback apparatus primarily consists of tuner 11, data separator 12, audio decoder 13, CM detector 14, interface 15, storage device 16, playback controller 17, system controller 18, AV decoder 19, monitor 20, and speaker 21.

Tuner 11 receives and detects an audio/video broadcasting signal to demodulate the signal to an encoded audio/video signal such as MPEG2-TS (Moving Picture Experts Group 2 Transport Stream) format. Data separator 12 separates the encoded audio/video signal such as MPEG2-TS which is sent from tuner 11, into an encoded audio signal and an encoded video signal. Audio decoder 13 converts the encoded audio signal, which is separated at data separator 12 into an audio signal.

CM detector 14, which includes silent detector 141 and determination unit 142, detects the contents of commercials. Specifically, silent detector 141 detects silence based on a power value of an audio signal, which audio decoder 13 converts, and determination unit 142 determines commercials based on silent segments, which silent detector detects. In addition, CM detector 14 records into storage device 16, a start time Tn and an end time Ty as silent segment information regarding a detected silent segment. The start time and the end time of the silent segment correspond to time in which the main program starts.

In the embodiment, a predetermined time T1 in commercial detection process (as described later), is equal to current commercial times (fifteen seconds, thirty seconds, sixty seconds, ninety seconds etc. . . . ). A predetermined time T2 is approximately one second. Interface 15 is an interface that records an encoded audio/video signal into storage device 16 and also reads an encoded audio/video signal from storage device 16. Additionally, interface 15 records silent segment information that is generated by CM detector 14 into storage device 16. Storage device 16 records an encoded audio/video signal. HDD (Hard Disk Drive) is shown in FIG. 1 as storage device 16; however, the device is not limited to this example.

Playback controller 17 performs playback control based on silent segment information stored in an HDD. Specified recorded parts, which are read from storage device 16, are replayed with AV decoder 19. System controller 18 controls components of the video playback apparatus in an organized manner. AV decoder 19 obtains an encoded audio/video signal such as MPEG2-TS format recorded in storage device 16 and converts the signal into an audio signal and a video signal. Monitor 20 relays the video signal out put for playback. Speaker 21 relays the audio signal output for playback.

In addition, the above data separator 12, audio decoder 13, CM detector 14, playback controller 17, system controller 18, and AV decoder 19 can be realized within a computer system such as CPU (Central Processing Unit), memory and LSI (Large Scale Integration). This implementation comprises: preparing software to materialize the above each unit, loading the software onto memory, and executing the CPU. Function blocks materialized within the collaboration above are shown in FIG. 1. Thus, several alternatives to materialize the function blocks with hardware, software, or the collaboration of both can be realized.

Figure 2:
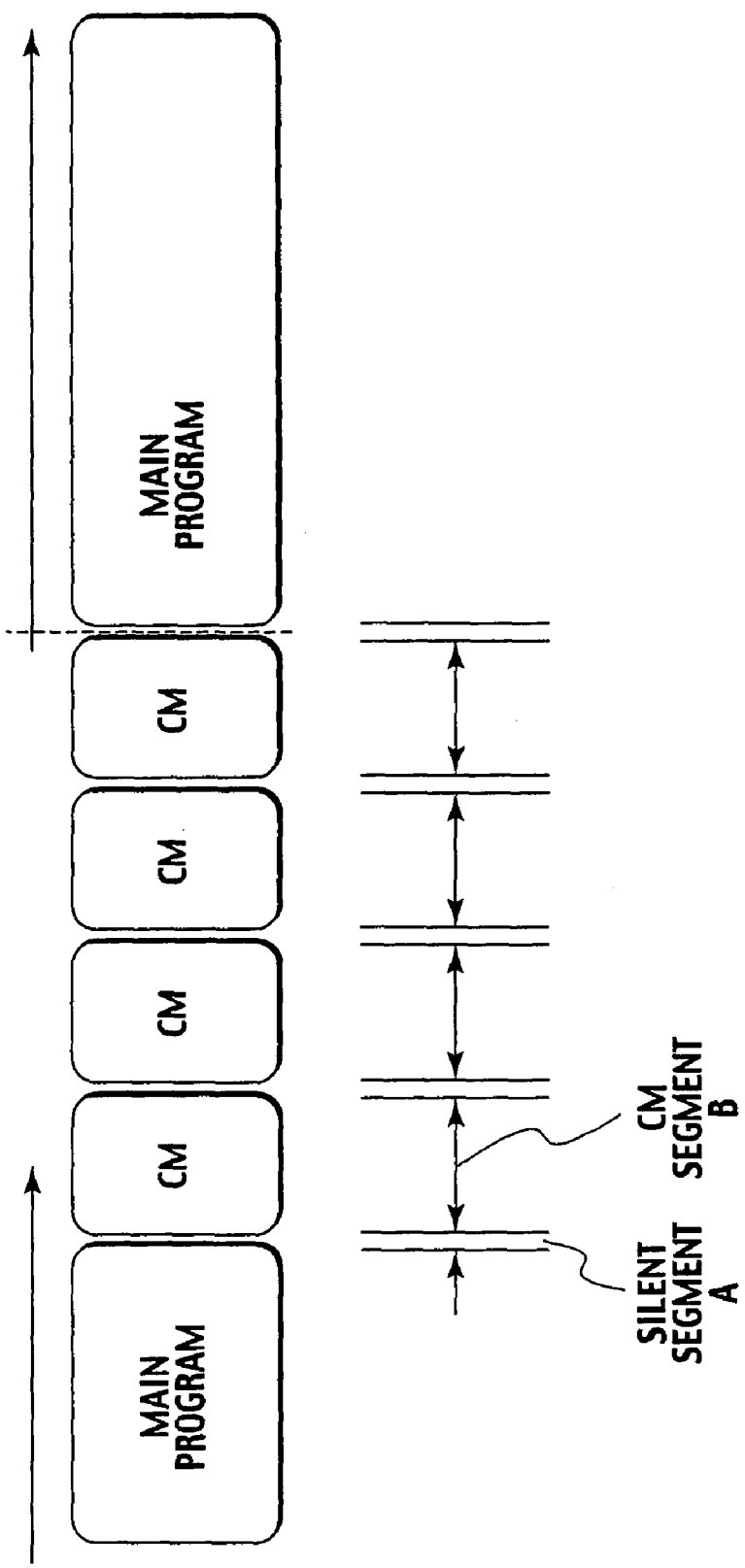
FIG. 2 is a diagram that shows an exemplary content structure.

Next, a video recording process using the structure above is explained. FIG. 2 is a basic diagram showing a video content including commercials with time flow and also demonstrates a situation where commercials are broadcast four times in the main program. According to the explanation below, FIG. 2 refers to period A in recorded content as a silent segment that is detected by a method as described later. A period B in a recorded content is a CM segment that is found between the silent segments A.

Figure 3:
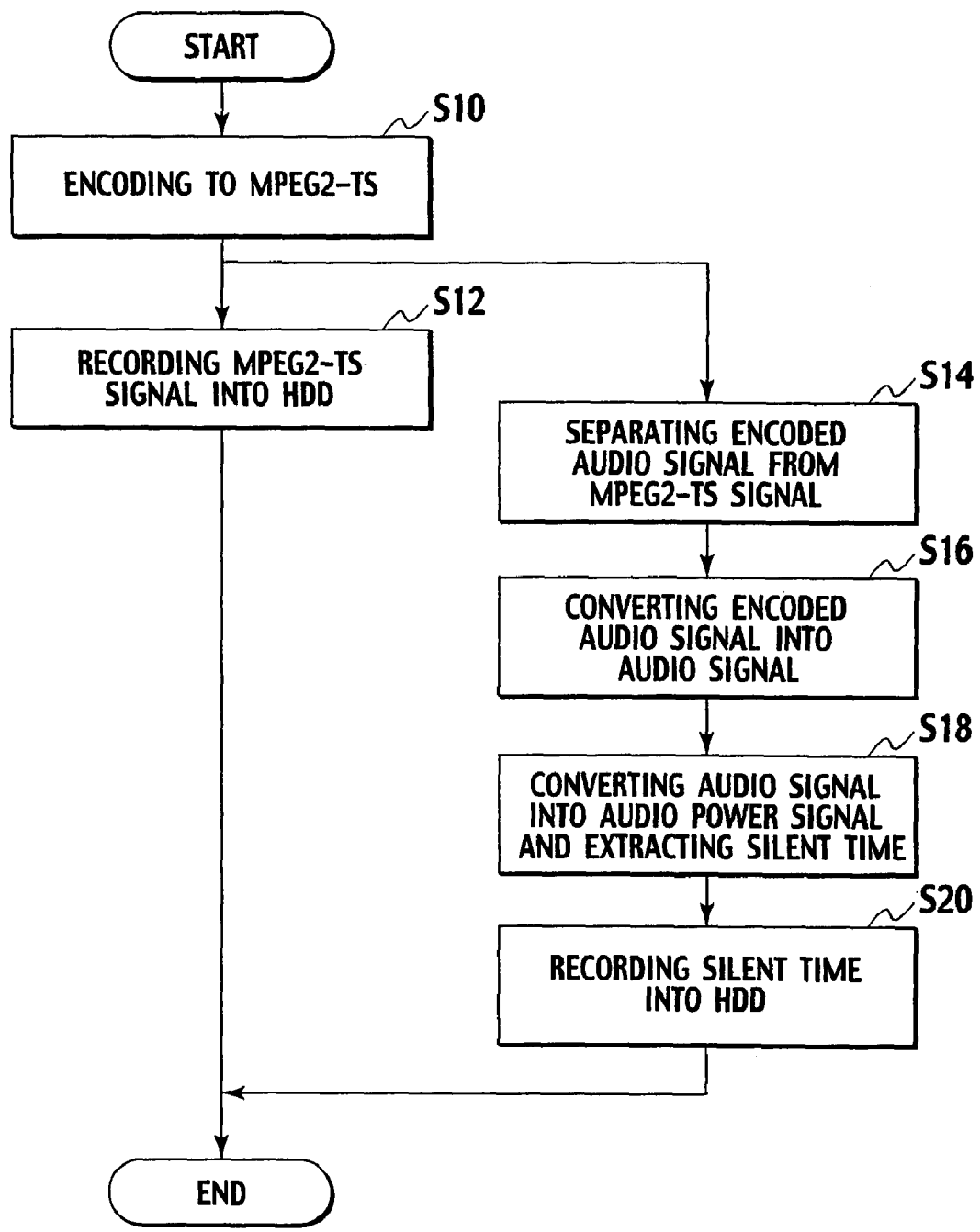
FIG. 3 is a flowchart showing a recording process according to the embodiment.

FIG. 3 is a basic flowchart showing a video recording process in a video playback apparatus. Tuner 11 receives and detects an audio/video broadcasting signal and demodulates the signal to an encoded audio/video signal in the first step of this process (S10). The next step is sending the encoded audio/video signal through interface 15 and recording the signal into storage device 16 with the predetermined signal format (S12).

The other steps of the process comprise: sending the audio/video signal encoded in S10 to data separator 12 and separating into an encoded audio signal (S14), converting the encoded audio signal into an audio signal by audio decoder 13 (S16), detecting a corresponding time from each main program start and silent segments based on the audio signal in CM detector 14 (S18), and going through interface 15 and recording start time and end time of the silent segments into storage device 16 (S20). The step in S18 specifically converts the audio signal into an audio power signal and extracts a silent time. The steps from S10 to S20 are performed using the audio/video signal received in S10.

Figure 4:
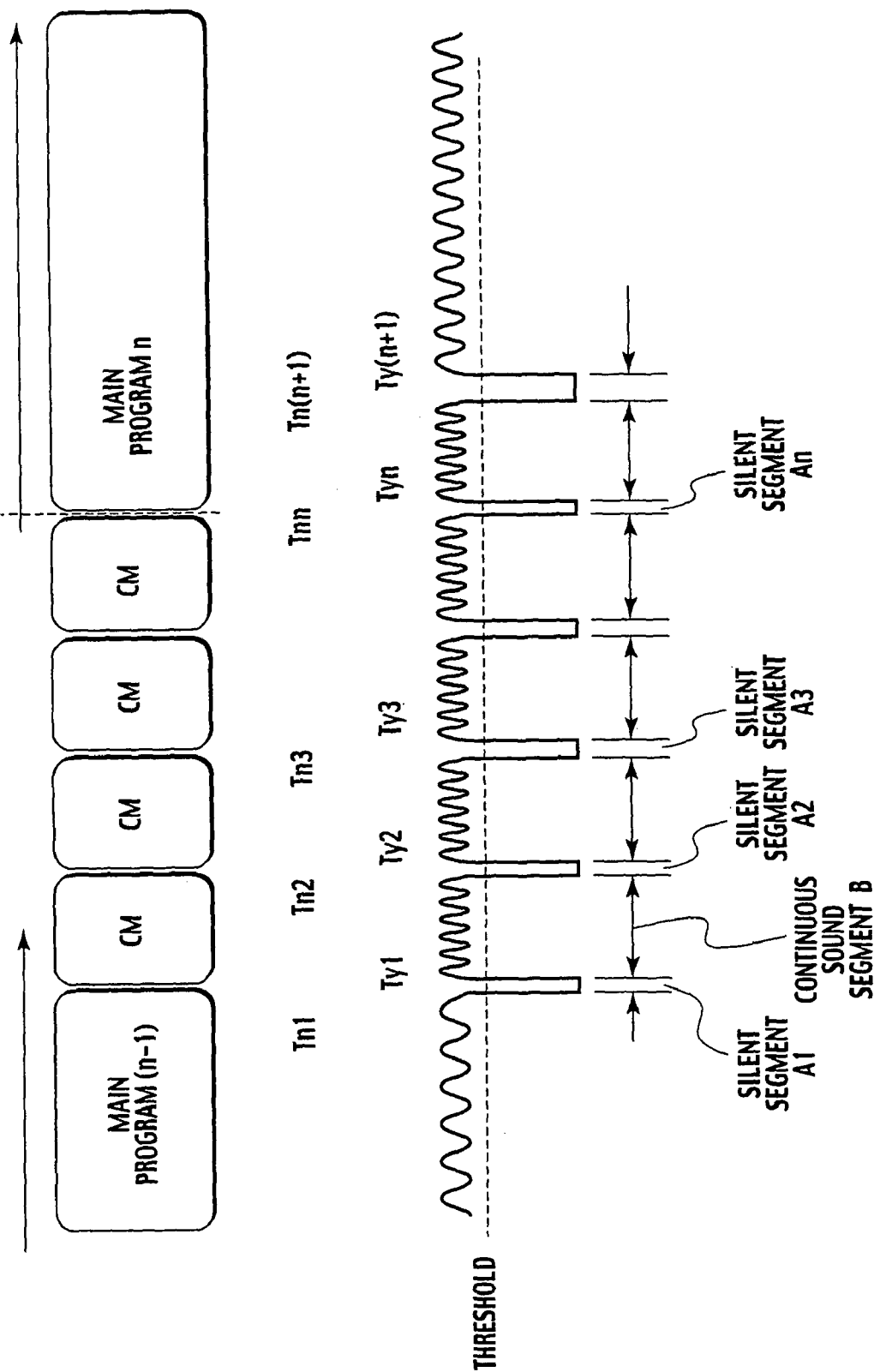
FIG. 4 is a diagram that explains a commercial detection according to the embodiment.

The procedure of detecting silent segments in the above S18 is explained with reference to FIG. 4. The CM detector 14 primarily performs this detecting silent segments procedure. According to an embodiment, continuous sound is determined if the strength of the audio signal output is above a certain threshold, and silence is determined if the strength of the audio signal output is below a certain threshold. FIG. 4 refers to segments (A1, A2, A3 . . . , An) as silent segments and a segment B as a continuous sound segment.

In general TV broadcasting, silent segments A before and after commercial broadcasting are approximately one second, and a commercial segment B between silent segments A is approximately fifteen seconds to ninety seconds of fixed time.

In S18 of FIG. 3, for silent segment information, a transition time from continuous sound to silent is recorded as a start time of silent segment A into storage device 16. Also, a transition time from silent to continuous sound is recorded as an end time of silent segment A into storage device 16.

FIG. 5 shows an example recording pattern of silent segment information. A start time and an end time for each silent segment are arranged and recorded. Further, in a commercial detection process, determining a continuous sound segment between a silent segment n and a subsequent silent segment (n+1) as a commercial or the main program is recorded with a result of commercial detection along the silent segment information. This commercial detection process is described below.

When a continuous sound segment n between the silent segment n and the subsequent silent segment (n+1) and a continuous sound segment (n+1) between the silent segment (n+1) and a subsequent silent segment (n+2) are changed from a commercial to the main program, the silent segment (n+1) between those continuous sound segments n and (n+1) is marked with a flag "1", which indicates that the main program starts from the continuous sound segment following the silent segment (n+1).

On the other side, when a continuous sound segment n between the silent segment n and the subsequent silent segment (n+1) and a continuous sound segment (n+1) between the silent segment (n+1) and a subsequent silent segment (n+2) are not changed from a commercial to the main program, the silent segment (n+1) between those continuous sound segments n and (n+1) is marked with a flag "0", which indicates the main program does not start from the continuous sound segment right after the silent segment (n+1). In addition, a method of marking flags is explained with FIG. 6 through FIG. 8.

As an example, FIG. 5 shows each corresponding time of a silent segment n: 0.000 second for start time Tn(1), 1.020 seconds for end time Ty(1), 23.531 seconds for start time Tn(2), 24.361 seconds for end time Ty(2), 38.086 seconds for start time Tn(3), 39.402 seconds for end time Ty(3), 53.341 seconds for start time Tn(4), 54.376 seconds for end time Ty(4).

In addition, the continuous sound segment between the silent segment 1 and the subsequent silent segment 2 is the main program, the continuous sound segment between the silent segment 2 and the subsequent silent segment 3 is a commercial, the continuous sound segment between the silent segment 3 and the subsequent silent segment 4 is a commercial, and the continuous sound segment between the silent segment 4 and the subsequent silent segment 5 is the main program.

Also, a continuous sound segment between the silent segment 3 and the subsequent silent segment 4 and a continuous sound segment between the silent segment 4 and the subsequent sound segment 5 indicates a transition from a commercial to the main program. As shown in FIG. 5, silent segment 1, which is found at the beginning of the main program (start time is zero second) is marked with a flag "1" because of a transition from a commercial.

Figure 6:
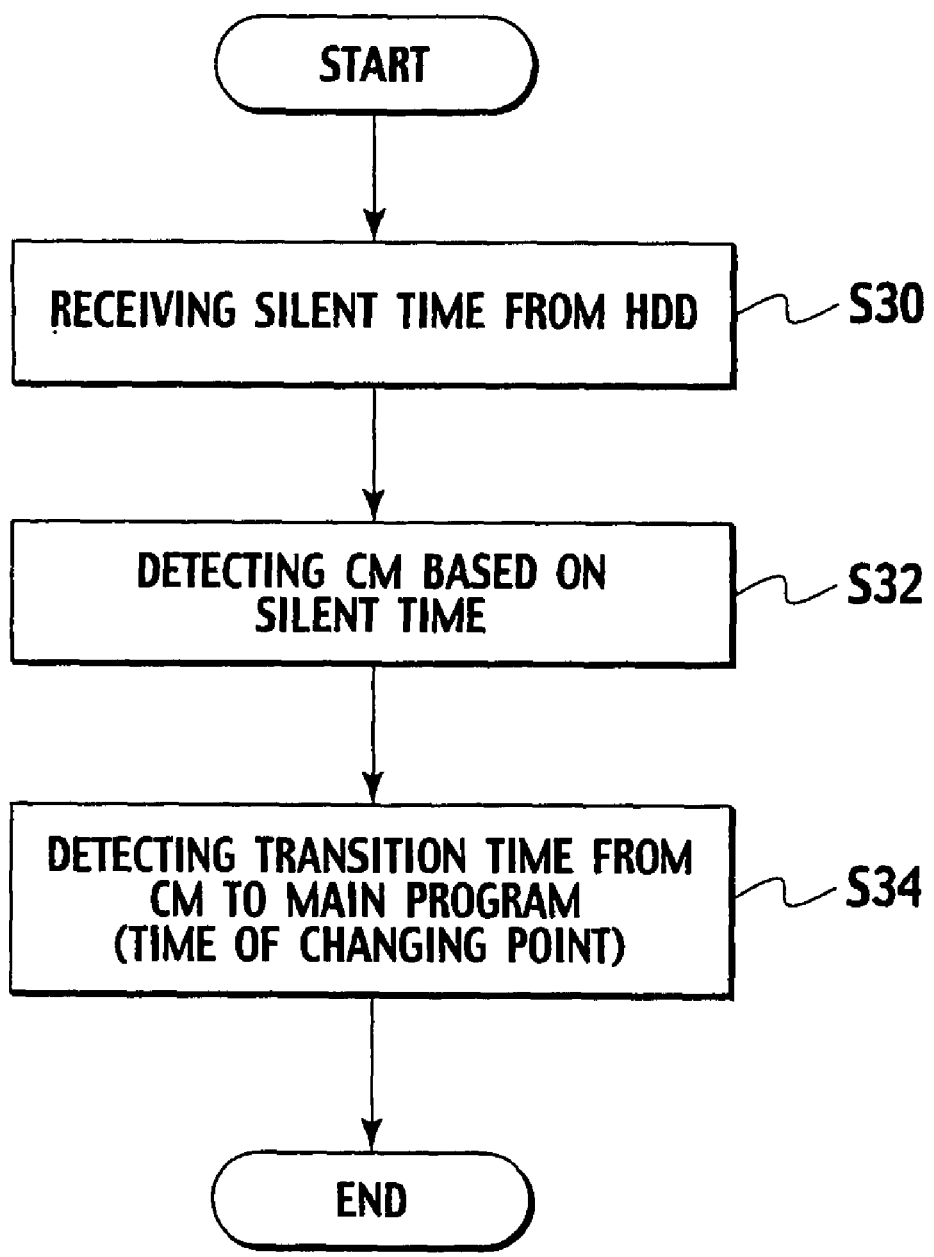
FIG. 6 is a flowchart showing a commercial detection process according to the embodiment.
Figure 7:
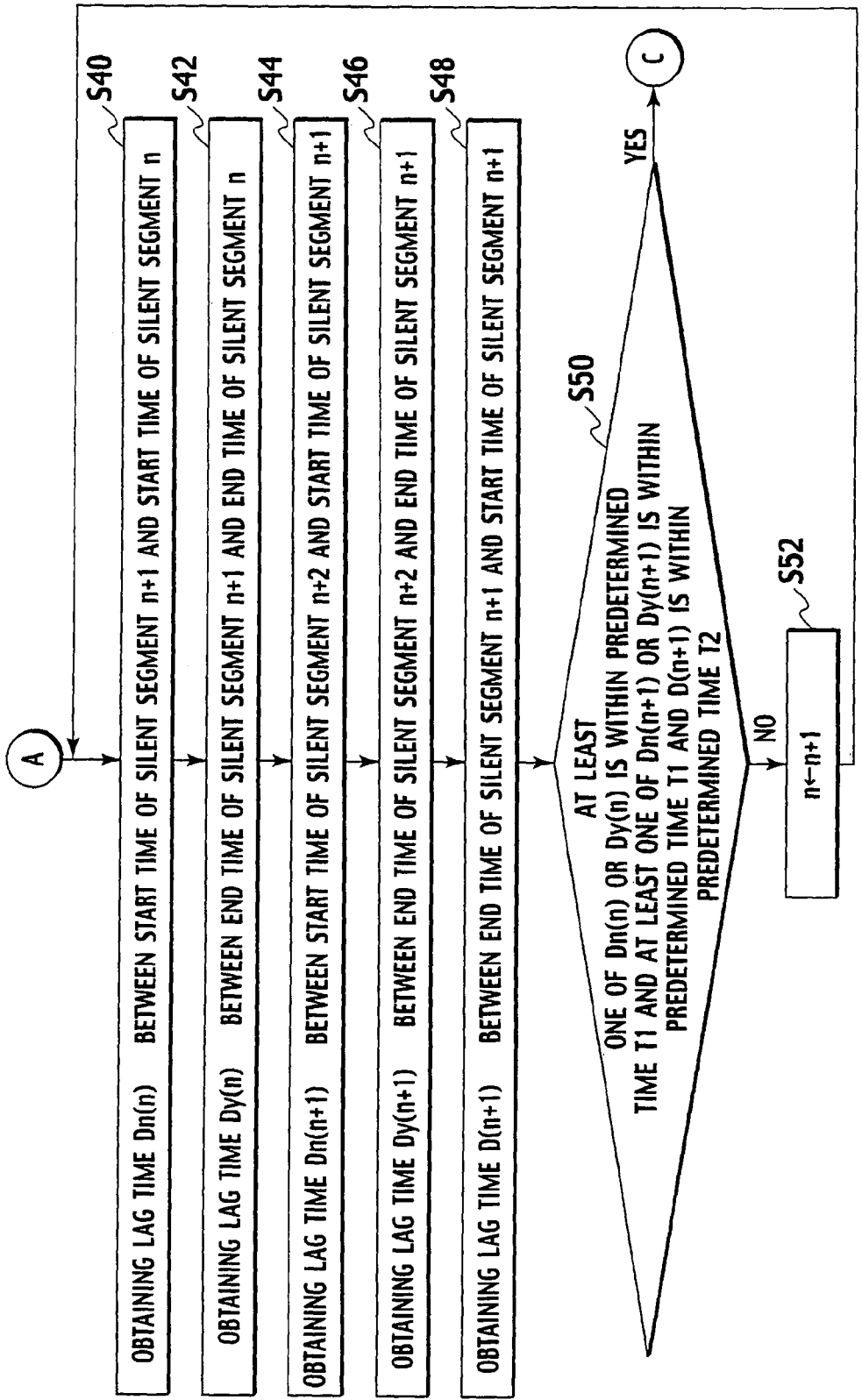
FIG. 7 is a flowchart showing a commercial detection process according to the embodiment.
Figure 8:
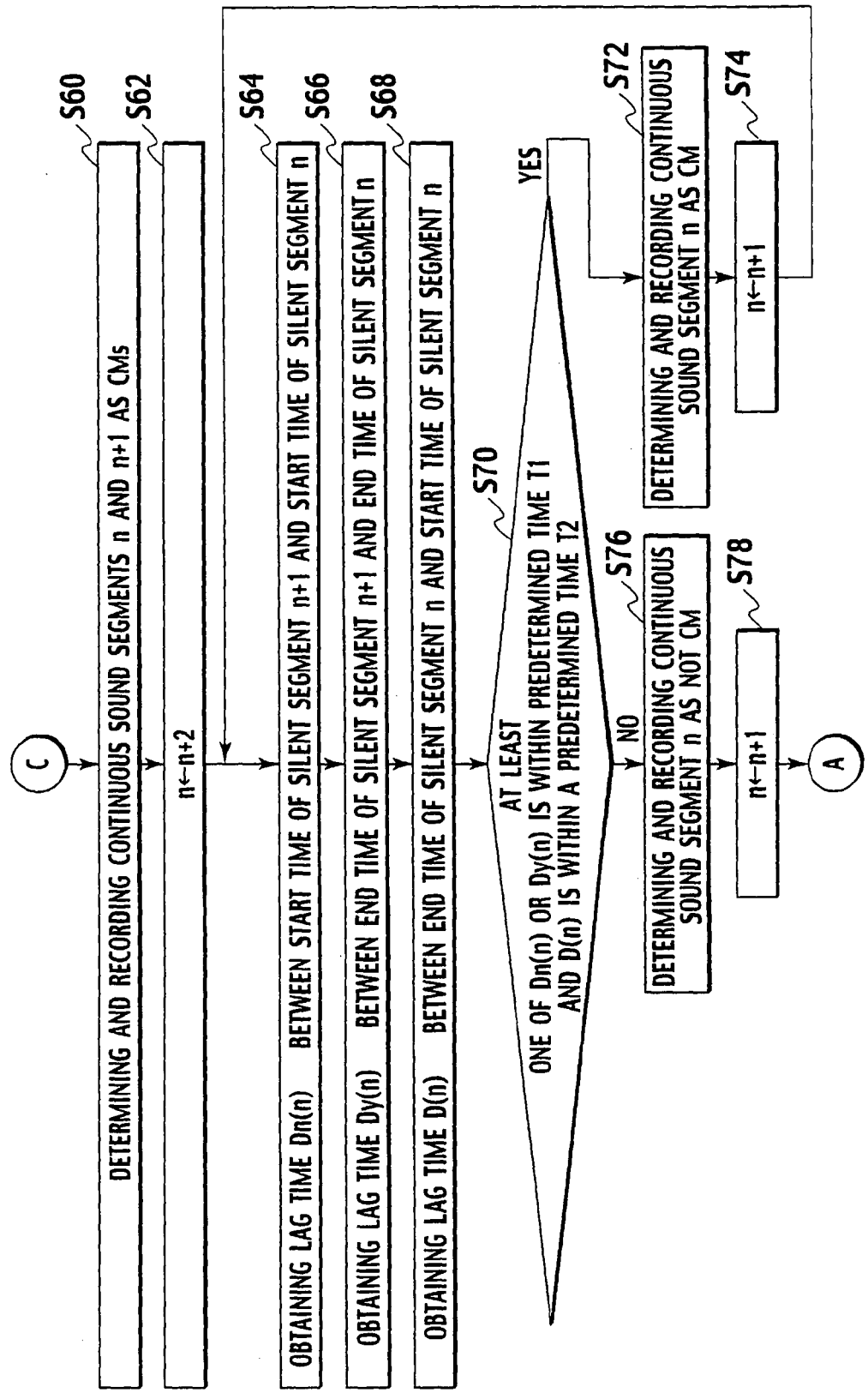
FIG. 8 is a flowchart showing a commercial detection process according to the embodiment.

Next, the above mentioned commercial detection process is explained. FIG. 6 through FIG. 8 are basic flowcharts that show a commercial detection process with a video playback apparatus. CM detector 14 principally performs the commercial detection process. Silent segments detected in the video recording process described above are used. In addition, this detection process starts at a selectable time after the recording process. For instance, playback controller 17 is executed prior to the contents when the latter is replayed.

First, step S30 in FIG. 6 obtains silent segment information from storage device 16 (S30). A continuous sound segment between a silent segment and a subsequent silent segment is determined as a commercial or not in accordance with the obtained information (S32). This procedure is explained afterward.

On the basis of a result in S32, a silent segment is extracted and marked (S34), in which a continuous sound segment transits from a commercial to the main program. For instance, "1" is marked in a column of "Flag before main program" of a silent segment that changes to the main program in FIG. 5 and corresponds to a silent segment in which a continuous sound segment transits from a commercial to the main program. In another instance, "0" is marked to a column of "Flag before main program" of a silent segment that changes to the main program in FIG. 5 and corresponds to a silent segment in which a continuous sound segment does not transit from a commercial to the main program. The above procedure is performed on all of the silent segment information.

Secondly, step S32 in FIG. 6 is explained with flowcharts shown in FIG. 7 and FIG. 8. In step S40 in FIG. 7, an initial value of n=1 is defined, and the lag time Dn(n) between start time Tn(n+1) of silent segment of $(n+1)^{th}$ and a start time Tn(n) of silent segment of $n^{th}$ is obtained (S40). Next, the lag time Dy(n) between an end time Ty(n+1) of the silent segment of $(n+1)^{th}$ and an end time Ty(n) of the silent segment of $n^{th}$ is obtained (S42). Then, the lag time Dn(n+1) between start time Tn(n+2) of silent segment of $(n+2)^{th}$ and a start time Tn(n+1) of silent segment of $(n+1)^{th}$ is obtained (S44), and the lag time Dy(n+1) in between an end time Ty(n+2) of silent segment of $(n+2)^{th}$ and an end time Ty(n+1) of silent segment of $(n+1)^{th}$ is obtained (S46). Then, lag time D(n+1) between an end time of silent segment of $(n+1)^{th}$ and a start time of silent segment of $(n+1)^{th}$ is obtained (S48).

Using results Dn(n), Dy(n), Dn(n+1), Dy(n+1), and D(n+1) of steps from S40 to S48, step S50 identifies whether the following condition: "At least one of Dn(n) or Dy(n) is within predetermined time T1, and at least one of Dn(n+1) or Dy(n+1) is within predetermined time T1, and D(n+1) is within predetermined time T2" is satisfied (S50). Some contents include relatively short silent segment between commercials. In such contents, the accuracy of the detecting commercials may improve if the step S48 is not carried out. Then the step S48 may be an optional step of the embodiment.

When the condition is satisfied, S50 proceeds to S60. If the condition is not satisfied, the corresponding silent segment information is updated with the change in value from n to n+1 (S52), and the process shifts back to S40.

In step S60 in FIG. 8, continuous sound segments n and n+1 are both determined as commercials. As a result of the commercial determination of the continuous sound segments n and n+1, "CM" is marked in the corresponding columns of "Is segment between n and n+1 CM or Main program?" and "Is segment between n+1 and n+2 CM or Main program?" in FIG. 5 (S60). Then, the corresponding silent segment information is updated with a change in value from n to n+2 (S62).

Next, lag time Dn(n) between start time Tn(n+1) of silent segment of $(n+1)^{th}$ and start time Tn(n) of silent segment of $n^{th}$ is obtained (S64). Then, the lag time Dy(n) between an end time Ty(n+1) of silent segment of $(n+1)^{th}$ and an end time Ty(n) of silent segment of $n^{th}$ is obtained (S66). And then, the lag time Dn(n) between an end time of silent segment of $(n)^{th}$ and a start time of silent segment of $(n)^{th}$ is obtained (S68).

Using results Dn(n), Dy(n), and D(n) of psteps from S64 to S68, step S70 identifies whether the following condition: "At least one of Dn(n) or Dy(n) is within predetermined time T1 and D(n) is within predetermined time T2" is satisfied (S70). When the condition is satisfied, S70 proceeds to S72. If the condition is not satisfied, S70 proceeds to S76.

When the condition is satisfied, continuous sound segment n is determined as a commercial, and "CM" is marked in the corresponding column of "Is segment between n and n+1 CM or Main program?" in FIG. 5 (S72). Then, corresponding silent segment information is updated with a change in value from n to n+1 (S74), and the process shifts back to S64. This process is performed repeatedly on all the silent segment information.

If the condition is not satisfied, then the continuous sound segment n is not deemed a commercial. For example, the continuous sound segment n is recognized as a main program, and "Main program" is marked in a corresponding column of "Is segment between n and n+1 CM or main program?" in FIG. 5 (S76). Then the corresponding silent segment information is updated with a change in value from n to n+1 (S78), and the process shifts back to S40. This process is repeatedly performed on all the silent segment information.

Predetermined time T1 used in S50 and S70 is equal to current commercial times (fifteen seconds, thirty seconds, sixty seconds, and ninety seconds, etc. . . . ), and the predetermined time T2 is approximately one second.

According to the processes shown in from FIG. 6 to FIG. 8, commercials can be detected accurately. Even if a silent segment between a commercial and the main program is longer than silent segments in commercials (because each silent segment has different time), the commercial still can be detected accurately.

Next, a commercial skip playback process is explained. This process skips commercials during replaying content that includes commercials. FIG. 9 is a basic flowchart showing the commercial skip playback process in a video playback apparatus.

Playback controller 17 receives a MPEG2-TS signal that corresponds to content being replayed from storage device 16 through interface 15 (S80). Next, playback controller 17 reads silent segment information obtained in the commercial detection process described above and determines commercial detection time. On the basis of the silent segment information, playback controller 17 extracts the MPEG2-TS signal from a non commercial part and forwards the signal to AV decoder 19. The signal is converted into a video signal or an audio signal. If the MPEG2-TS signal is from a commercial part, the signal stored in storage device 16 is not converted to a video signal or an audio signal and is skipped (S82).

The MPEG2-TS signal forwarded to AV decoder 19 is decoded and is converted into a video signal or an audio signal (S84). Each video signal and audio signal is sent to monitor 20 or speaker 22 for playback (S86).

According to the description above, in the steps S50 and S70, detected silent segments in content are determined as commercials in accordance with several conditions. Therefore, commercials can accurately be detected. Especially, using the start and end times of silent segments, several seconds of silent segments that occur between the main program and commercials also can be detected, and a continuous sound segment that is found between a front silent segment and a back silent segment can be determined either as commercial or the main program. As a result, a front continuous sound segment and a back continuous sound segment can be determined as possible transitions from commercial to main program.

Accordingly, a beginning point of the main program in content (a changing point from a commercial to the main program) can be detected more accurately and a playback function that efficiently digests and thus excludes commercials can be realized. This can improve user convenience.

In addition, obtaining silent segment information at a selectable time by recording information for the detected silent segment allows a determination to be made as to whether or not a silent segment is detected essentially within a set time span.

Further, a start time and an end time are used as information regarding silent segments in the above described embodiment; however, its median time may also be used.

In addition, information regarding silent segments is recorded into storage device to detect commercials in the above described embodiment; however, without recording into the storage device, commercial detection may also simultaneously be performed with processing playback.

In addition, the predetermined time T1 in S50 and S70 is selected and is used from one of time values (fifteen seconds, thirty seconds, sixty seconds, and ninety seconds, etc. . . . ) in the above described embodiment; however, all time values (fifteen seconds, thirty seconds, sixty seconds, and ninety seconds, etc. . . . ) may also be selected at the same time and be used in the determination processes.

According to conventional commercial detection apparatuses, if there are silent segments within a set time span in the main program, a continuous sound segment that is found between the silent segments is incorrectly determined as a commercial. However, segments are determined as commercials only when each segment is found between consecutive silent segments according to the embodiment. Therefore, errors in commercial detection can be reduced.

Silent segments (e.g., approximately several seconds) between a commercial and the main program are relatively longer than silent segments (e.g., 0.5 seconds) between commercials. According to this embodiment, commercials accurately can be detected even if there is a longer silent segment between a commercial and the main program.

In addition, commercials are incorrectly detected if consecutive silent segments occur within a set time span by coincidence. However, commercial segments accurately can be specified by comprising both a first extraction unit and a second extraction unit. Outside parts of two silent segments that are detected with the first extraction unit are equal to the main program part. Therefore, a boundary of a commercial part and the main program part also can be extracted accurately by using information for these two silent segments detected with the first extraction unit.

Preferably, the above mentioned video playback apparatus uses information regarding time for the commercial detected by the commercial detection apparatus to play the digest playback of the content. Further, the above commercial detection apparatus specifies accurate commercial locations. As a result, a video playback apparatus, which comprises a digest playback function, can play a digest video that completely excludes commercial parts. Commercial location information also may be used to create a digest video in a digest playback process. Specifying accurate commercial locations is important in the above states; therefore, a video playback apparatus that utilizes the commercial detection apparatus of the invention is enormously efficient.

In addition, the above mentioned silent detector and the above mentioned determination unit correspond to CM detector 14 of a video playback apparatus in the embodiment.

According to the embodiment described above, a commercial detection apparatus that accurately detects commercials in content can be provided.

The invention may be embodied in other specific forms without departing from the spirit or essential characteristics thereof. The embodiments therefore are to be considered in all respects as illustrative and not restrictive; the scope of the present invention being indicated by the appended claims rather than by the foregoing description, and all changes that come within the meaning and range of equivalency of the claims are therefore intended to be embraced therein.

What is claimed is:

1. A commercial detection apparatus which detects commercials, comprising:
   a processor; and
   a silent detector module which controls the processor to detect a start time and an end time of a silent segment based on a strength of an audio signal output in content;
   a determination module which controls the processor to determine a sound segment as a commercial based on the detected silent segment, wherein the determination module determines a sound segment as a commercial if the sound segment is found between consecutive silent segments that are detected by the silent detector module, and wherein a lag time of each start time is within a set time period, the determination module which also determines a sound segment as a commercial if the sound segment is found between consecutive silent segments that are detected by the silent detector and wherein a lag time of each end time is within a set time period;
   a first extraction module which extracts longer silent segments, each longer silent segment being longer than a set time of the silent segments detected by the silent detector module; and
   a second extraction module which extracts shorter silent segments, each shorter silent segment being shorter than the set time of the silent segments detected by the silent detector module; and
   wherein the determination module determines a sound segment as a commercial if the sound segment is found between silent segments, and wherein one of the silent segments extracted by the second extraction module occurs between two of the silent segments extracted by the first extraction module.

2. The commercial detection apparatus as claimed in claim 1, wherein the determination module determines a sound segment as a commercial if the sound segment is found between silent segments and the found sound segment is shorter than a set time, and wherein one of the silent segments extracted by the second extraction module occurs between two of the silent segments extracted by the first extraction module.

3. A video playback apparatus comprising:
   a processor; and,
   a silent detector module which controls the processor to detect a start time and an end time of a silent segment based on the strength of an audio signal output in content;
   a determination module which controls the processor to determine a sound segment as a commercial based on the detected silent segment; a main program start extraction unit configured to extract silent segments transitioning from a commercial to the main program;
   a playback controller configured to playback a digest of the main program while skipping one or more sound segments that are determined as commercials based on the extracted silent segments, wherein the determination module determines a sound segment as a commercial if the sound segment is found between consecutive silent segments that are detected by the silent detector module, and wherein lag time of each start time is within a set time period, and determines a sound segment as a commercial if the sound segment is found between consecutive silent segments that are detected by the silent detector module and wherein lag time of each end time is within a set time period;
   a first extraction module which extracts a longer silent segment than a set time from the silent segments detected by the silent detector module; and
   a second extraction module which extracts a shorter silent segment than the set time from the silent segments detected by the silent detector module; and wherein the determination module determines a sound segment as commercials if the sound segment is found between silent segments, and wherein one of the silent segments extracted by the second extraction module occurs between two of the silent segments extracted by the first extraction module.

4. The video playback apparatus as claimed in claim 3, wherein the determination module determines a sound segment as a commercial if each time span of the sound segment found between silent segments from a second extraction module is within a set time period.

* * * * *